(12) United States Patent
Imada et al.

(10) Patent No.: US 9,423,782 B2
(45) Date of Patent: Aug. 23, 2016

(54) MOTOR DRIVE DEVICE

(71) Applicant: Panasonic Intellectual Property Management Co., Ltd., Osaka (JP)

(72) Inventors: Yu-suke Imada, Osaka (JP); Kenichi Suzuki, Osaka (JP); Masaru Nishizono, Osaka (JP); Hiroshi Fujiwara, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/782,598

(22) PCT Filed: Apr. 9, 2014

(86) PCT No.: PCT/JP2014/002036
§ 371 (c)(1),
(2) Date: Oct. 5, 2015

(87) PCT Pub. No.: WO2014/167852
PCT Pub. Date: Oct. 16, 2014

(65) Prior Publication Data
US 2016/0048116 A1 Feb. 18, 2016

(30) Foreign Application Priority Data

Apr. 11, 2013 (JP) .................. 2013-082739

(51) Int. Cl.
*G05B 19/10* (2006.01)
*H03K 5/00* (2006.01)
(Continued)

(52) U.S. Cl.
CPC ............... *G05B 19/04* (2013.01); *G05B 19/19* (2013.01); *G05B 19/404* (2013.01); *G05B 19/416* (2013.01); *H02P 23/14* (2013.01); *G01P 3/481* (2013.01)

(58) Field of Classification Search
CPC ..... G01P 3/481; G05B 19/19; G05B 19/404; G05B 19/416; G05B 19/04; H02P 23/14

USPC ............................................. 318/400.13, 567
See application file for complete search history.

(56) References Cited

U.S. PATENT DOCUMENTS

| 5,424,960 A | 6/1995 | Watanabe et al. |
| 5,475,291 A | 12/1995 | Yoshida et al. |

(Continued)

FOREIGN PATENT DOCUMENTS

| JP | 5-346359 | 12/1993 |
| JP | 6-148032 | 5/1994 |

(Continued)

OTHER PUBLICATIONS

International Search Report of PCT application No. PCT/JP2014/002036 dated May 13, 2014.

*Primary Examiner* — Bentsu Ro
*Assistant Examiner* — Zemenay Truneh
(74) *Attorney, Agent, or Firm* — Hamre, Schumann, Mueller & Larson, P.C.

(57) ABSTRACT

Motor drive device (30) according to the present invention includes operation pattern generator (1), position and speed controller (23), load characteristic compensator (24), and load characteristic measurement unit (7). Operation pattern generator (1) increases an absolute value of acceleration, at which a motor speed or a motor position is changed, in each operation pattern. Load characteristic measurement unit (7) measures the load characteristic to set load characteristic compensator (24) when torque command indicator is less than or equal to a torque limit value. Load characteristic measurement unit (7) ends the measurement of the load characteristic without setting load characteristic compensator (24) when the torque command indicator is greater than the torque limit value.

10 Claims, 4 Drawing Sheets

(51) Int. Cl.
*G05B 19/04* (2006.01)
*G05B 19/19* (2006.01)
*G05B 19/404* (2006.01)
*G05B 19/416* (2006.01)
*H02P 23/14* (2006.01)
*G01P 3/481* (2006.01)

(56) References Cited

U.S. PATENT DOCUMENTS

2010/0052593 A1 3/2010 Kishimoto et al.
2010/0333010 A1 12/2010 Yamaichi et al.
2011/0127938 A1* 6/2011 Kawakami ............ G01P 3/481
 318/400.13
2012/0268054 A1 10/2012 Kishimoto et al.

FOREIGN PATENT DOCUMENTS

| | | |
|---|---|---|
| JP | 6-319284 | 11/1994 |
| JP | 2004-274976 | 9/2004 |
| JP | 2007-135344 | 5/2007 |
| JP | 2009-081985 | 4/2009 |
| WO | 2008/087893 | 7/2008 |
| WO | 2009/096169 | 8/2009 |

* cited by examiner

MOTOR DRIVE DEVICE

CROSS-REFERENCE TO RELATED APPLICATIONS

This application is a U.S. national stage application of the PCT International Application No. PCT/JP2014/002036 filed on Apr. 9, 2014, which claims the benefit of foreign priority of Japanese patent application 2013-082739 filed on Apr. 11, 2013, the contents all of which are incorporated herein by reference.

TECHNICAL FIELD

The present invention relates to a motor drive device that controls a servo motor, particularly to estimation of load measurement.

BACKGROUND ART

Recently, performance of a built-in microcomputer has been enhanced. There has been also developed an integrated circuit in which a customizable element is combined with a conventional ASIC (Application Specific Integrated Circuit). Examples of the built-in microcomputer include a RISC microcomputer (Reduced Instruction Set Computer-microcomputer) and a DSP (Digital Signal Processor). Examples of the integrated circuit include an FPGA (Field Programmable Gate Array) and an SoC (System-on-a-Chip).

Currently, using the built-in microcomputer and the integrated circuit, a motor drive device includes various automatic adjustment functions in addition to a basic function when driving the servo motor based on an external command. As used herein, the basic function means position control, speed control, and current control in which drive of a servo motor is controlled.

FIG. 4 is a block diagram illustrating a conventional motor drive device.

As illustrated in FIG. 4, motor drive device 402 includes the basic function of controlling the drive of motor 4. In FIG. 4, basic performance is implemented by the following flow in which blocks are connected to each other by a solid line using a block surrounded by a singlet.

Host device 401 transmits an external position command to motor drive device 402. The external position command transmitted from the host device 401 is received by command selector 21 of motor drive device 402. Command selector 21 selects one of internal position command transmitted from test run function 211 (to be described later) and the external position command transmitted from host device 401. Command selector 21 transmits one of the internal position command and the external position command, which is selected by command selector 21, to command response setting unit 22 as a post-selection position command.

Command response setting unit 22 performs smoothing processing, that is, leveling processing. Command response setting unit 22 also performs filter calculation processing in which one of the internal position command and the external position command is used as input. After performing the filter calculation processing, command response setting unit 22 transmits a result of the filter calculation processing to position and speed controller 23 as a command.

Position and speed controller 23 performs a feedback control calculation using the command transmitted from command response setting unit 22 and motor positional information transmitted from encoder 5. The feedback control calculation is typified by PID control (Proportional Integral Derivative Controller). After performing the feedback control calculation, position and speed controller 23 transmits a torque command such that a position deviation becomes zero.

Load characteristic compensator 24 performs scaling processing on the torque command transmitted from position and speed controller 23 in accordance with total inertia. As used herein, the total inertia means inertia of motor 4 or load 6, and the like. Load characteristic compensator 24 performs the scaling processing to absorb a difference of load inertia.

Load characteristic compensator 24 estimates friction torques of motor 4 and load 6 from the motor positional information transmitted from encoder 5. Load characteristic compensator 24 previously adds the estimated friction torque to generate a post-compensation torque command. Load characteristic compensator 24 transmits the generated post-compensation torque command to resonance suppressor 25.

Sometimes a vibration is caused by resonance characteristics of motor 4 and load 6. Resonance suppressor 25 performs notch filter processing or low-pass filter processing of removing a specific frequency component from the post-compensation torque command such that the caused vibration is not excited. Resonance suppressor 25 transmits a result of the notch filter processing or low-pass filter processing to motor 4 as a final torque command.

As illustrated in FIG. 4, motor drive device 402 includes an automatic adjustment function. In FIG. 4, the automatic adjustment function is implemented by the following flow in which blocks are connected to each other by a broken line using a block surrounded by a doublet.

For example, as disclosed in PTL 1, test run function 211 generates a reciprocating running pattern in motor drive device 402. The reciprocating running pattern is a fixed amount of triangular wave having acceleration or deceleration with a certain inclination. The reciprocating running pattern has positive and negative levels.

Generally, in test run function 211, when an external parameter is set, a command pattern is automatically calculated in real time through NC calculation processing incorporated in motor drive device 402. As used herein, the external parameter means a movement amount, a maximum speed, an acceleration time, a deceleration time, a stopping time, and the like. Test run function 211 is a function of generating the internal position command in each given period.

When the internal position command is transmitted from test run function 211 to command selector 21, test run function 211 can also transmit additional information such that command selector 21 selects the internal position command. When the additional information is transmitted, an operation of command selector 21 can be designed from test run function 211.

For example, as disclosed in PTL 2, command response setting function 221 determines a cutoff frequency of a command prefilter that determines responsiveness of a position command. One indicator called a stiffness value is provided to command response setting function 221 from the outside of motor drive device 402. Command response setting function 221 determines the cutoff frequency of the command prefilter from the provided stiffness value and a table incorporated in motor drive device 402.

Generally, command response setting function 221 automatically sets one or a plurality of parameters of command response setting unit 22 by receiving one or a plurality of command response indicators indicated by the following form. In some forms in which the command response indicator is received, an instruction of a finer frequency characteristic is issued with a first-order or second-order lag filter time constant or a damping ratio. In other forms in which the command response indicator is received, an instruction of transient characteristic of time response such as a rise time, a delay time, and an overshoot amount is issued. Command response setting function 221 automatically sets one or a plurality of parameters of command response setting unit 22 such that a transmission or reception relationship with command response setting unit 22 is matched with the command response indicator as much as possible.

For example, as disclosed in PTL 3, in stiffness setting function 231, one parameter typifying servo stiffness is used as the indicator. Stiffness setting function 231 multiplies one parameter typifying the servo stiffness by a given ratio to set a speed proportional gain, a speed integral gain, and a position proportional gain in synchronization with one another. As disclosed in PTL 2, a gain of a position and speed controller 23 may be set from the table corresponding to the stiffness value.

Generally, stiffness setting function 231 receives one or a plurality of stiffness indicators, and automatically sets one or a plurality of parameters of position and speed controller 23 such that a disturbance response of position and speed controller 23 is matched with the stiffness indicator as much as possible.

For example, as disclosed in PTL 4, load characteristic measuring function 241 can automatically estimate a friction characteristic from the torque command transmitted to motor 4, the motor positional information transmitted from encoder 5, and the speed and acceleration that are of a high-order difference of the motor positional information using least square estimation. As used herein, the friction characteristic means a total inertia in which inertia of motor 4, the inertia of load 6, and the like are summed up, a biased load torque which always acts constantly, a kinetic friction torque depending on an operation direction, a viscous friction torque proportional to an operation speed, and like.

Load characteristic measuring function 241 reflects the estimated result in load characteristic compensator 24 in real time. Therefore, even if any load 6 is connected, load characteristic compensator 24 can obtain the identical responsiveness designated by the command response indicator or stiffness indicator, and have adaptive robustness.

For example, as disclosed in PTL 5, adaptive filter function 251 automatically adjusts the parameter of resonance suppressor 25 using an adaptive algorithm, in which a recursive notch filter is used, such that a high-frequency component extracted from a motor speed is brought close to zero as much as possible. Adaptive filter function 251 has the following variations. In one of the variations, a vibration component is extracted from the torque command. In another variation, the vibration component is extracted from a difference with a model response. In still another variation, a plurality of adaptive filters is included. In yet another variation, a width, a depth, and a Q value are automatically adjusted in addition to a notch frequency.

Generally adaptive filter function 251 extracts the vibration component caused by the resonance characteristics of motor 4 and load 6 by some kind of method. Adaptive filter function 251 automatically sets a filter parameter of resonance suppressor 25 using an adaptive algorithm for minimizing a difference with a normative input.

For example, as disclosed in PTL 6, oscillation detecting function 26 extracts a fluctuation component from the motor positional information transmitted from encoder 5. Oscillation detecting function 26 detects oscillation states of motor 4 and load 6 by a comparison between the extracted fluctuation component and a threshold, a determination of a duration, and the like.

When oscillation detecting function 26 detects the oscillation, oscillation detecting function 26 transmits oscillation detection information to stiffness setting function 231 mentioned above. Thus, oscillation detecting function 26 selects the stiffness value such that a frequency band width of a feedback loop is narrowed, and automatically suppresses the oscillation.

For example, as disclosed in PTL 7, evaluation indicator measuring function 27 periodically measures and stores input and output data. Evaluation indicator measuring function 27 is function to calculate, display, and accumulate an evaluation value from the input and output data corresponding to the evaluation indicator. As used herein, the input and output data means the position command output of command selector 21, the motor position output of encoder 5, the torque command output of load characteristic compensator 24, and the like. As used herein, the evaluation indicator means a settling time, an overshoot, a torque fluctuation, and the like. One of the important features of the present function is that data is compressed to fewer meaningful evaluation indicators from a huge amount of motor control information that can be obtained in real time.

CITATION LIST

Patent Literature

PTL 1: Unexamined Japanese Patent Publication No. 5-346359
PTL 2: Unexamined Japanese Patent Publication No. 2007-336792
PTL 3: Unexamined Japanese Patent Publication No. 6-319284
PTL 4: Unexamined Japanese Patent Publication No. 2005-168166
PTL 5: Unexamined Japanese Patent Publication No. 2004-274976
PTL 6: International Patent Publication No. 2008/087893
PTL 7: International Patent Publication No. 2009/096169

SUMMARY OF THE INVENTION

A motor drive device covered by the present invention drives a motor. The motor drive device includes an operation pattern generator, a position and speed controller, a load characteristic compensator, and a load characteristic measurement unit.

The operation pattern generator generates an operation pattern that issues an instruction of at least one of a motor speed and a motor position to a motor. The operation pattern generator generates an operation command including at least one operation pattern. The operation pattern generator transmits the generated operation command.

The position and speed controller receives the operation command and motor positional information transmitted from an encoder. The position and speed controller generates a torque command such that a deviation of at least one of the motor position and the motor speed becomes zero. The position and speed controller transmits the generated torque command.

The load characteristic compensator receives the torque command, the motor positional information, and a load characteristic estimated value. The load characteristic compensator performs scaling processing on the torque command transmitted in accordance with total inertia. The load characteristic compensator adds a friction torque estimated value of a load to the torque command after the scaling processing, and generates a post-compensation torque command to drive the motor.

The load characteristic measurement unit generates a torque command indicator and a torque limit value. The load characteristic measurement unit receives the post-compensation torque command and the motor positional information. The load characteristic measurement unit measures a load characteristic of the load to set the load characteristic compensator.

Particularly, the operation pattern generator increases an absolute value of acceleration, at which the motor speed or the motor position is changed, in each operation pattern.

The load characteristic measurement unit measures the load characteristic to set the load characteristic compensator when the torque command indicator is less than or equal to the torque limit value. The load characteristic measurement unit ends the measurement of the load characteristic without setting the load characteristic compensator when the torque command indicator is greater than the torque limit value.

DESCRIPTION OF EMBODIMENTS

In a motor drive device according to an exemplary embodiment of the present invention, a worker who does not have detailed knowledge or a sufficient experience can generate the optimum operation pattern associated with servo adjustment in measuring a load characteristic, by a configuration shown later.

A conventional motor drive device has the following points to be improved. That is, in the conventional motor drive device, various automatic adjustment functions are individually optimized. Therefore, the conventional motor drive device is not most suitable for the servo adjustment, particularly for the measurement of the load characteristic.

Figure 4:
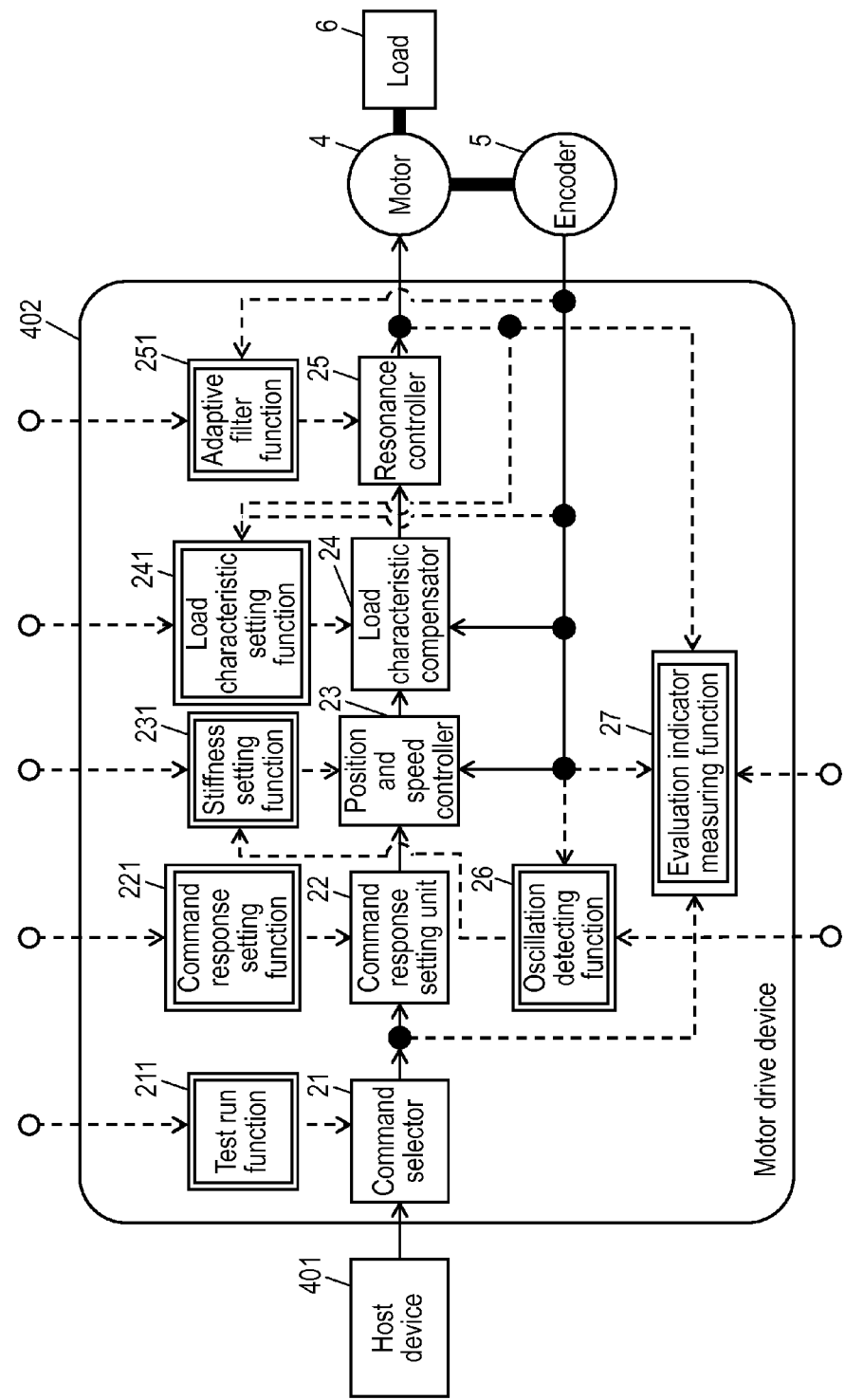
FIG. 4 is a block diagram illustrating a conventional motor drive device.

For example, test run function 211 in FIG. 4 is used in applications other than the servo adjustment. Specifically, test run function 211 is used to find an origin during assembly of an instrument provided with the motor drive device, aging during operation confirmation, and a retreating operation during maintenance work.

Therefore, in test run function 211, a specification or a setting can be changed with respect to a movement amount, speed, and acceleration.

However, a worker is required for knowledge associated with the servo adjustment and various automatic adjustment functions in the case that various settings associated with the servo adjustment are changed.

Load characteristic measuring function 241 is a useful function of automatically adjusting the load characteristic associated with load characteristic compensator 24. Examples of the load characteristic include total inertia and friction compensation. However, load characteristic measuring function 241 is not suitable for applications in which the load characteristic changes steeply.

For example, least square estimation is adopted as a method for guessing each parameter. However, it is improper that the least square estimation is always applied to the following apparatus. Examples of the following apparatus include a multi-joint robot, a pick-and-place-system apparatus, and a cam drive apparatus in which the total inertia fluctuates periodically. Because of a direct-drive configuration, a load fluctuation has a large influence on the pick-and-place-system apparatus.

Friction compensation is adopted as another method for guessing each parameter. However, the friction compensation is an ineffective way in the case that motor 4 is incorporated in the instrument. For example, a direction of gravity generated in single motor 4 changes in the case that motor 4 is incorporated in the instrument like the multi-joint robot. Accordingly, a biased load torque is ineffectively estimated with respect to single motor 4 from the viewpoint of the friction compensation of the multi-joint robot.

An error generated by an operation pattern of motor 4 or a non-linear characteristic has an influence on the load characteristic estimation based on a least square method, the friction compensation being predicated on the load characteristic estimation. Therefore, the worker is required for the knowledge and experience about system identification in order to obtain the optimum estimated value.

Hereinafter, exemplary embodiments of the present invention will be described with reference to the drawings. The following exemplary embodiments illustrate specific examples of the present invention, but do not restrict the technical range of the present invention.

Exemplary Embodiment

Figure 1:
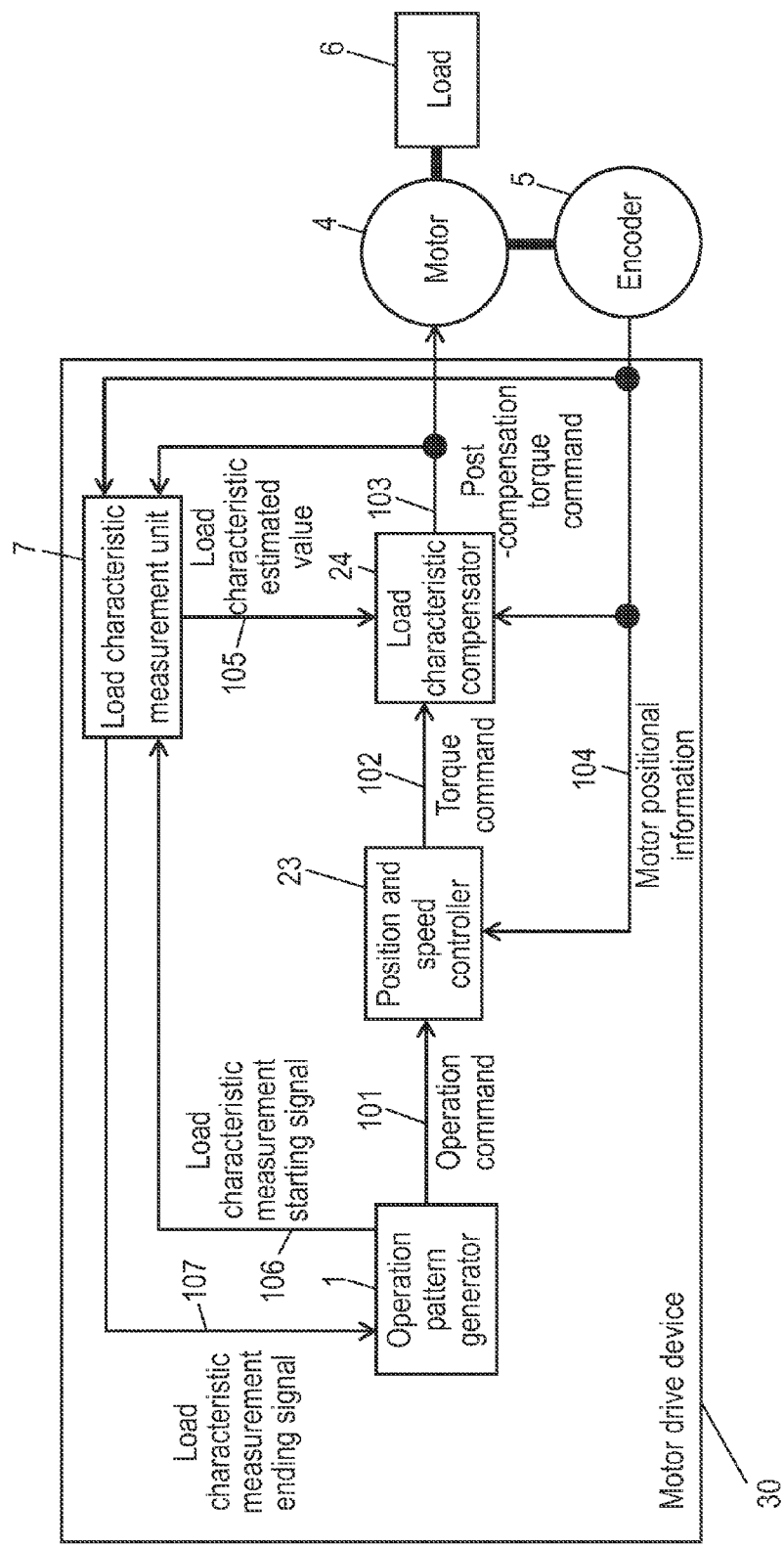
FIG. 1 is a block diagram illustrating a motor drive device according to an exemplary embodiment of the present invention.
Figure 2:
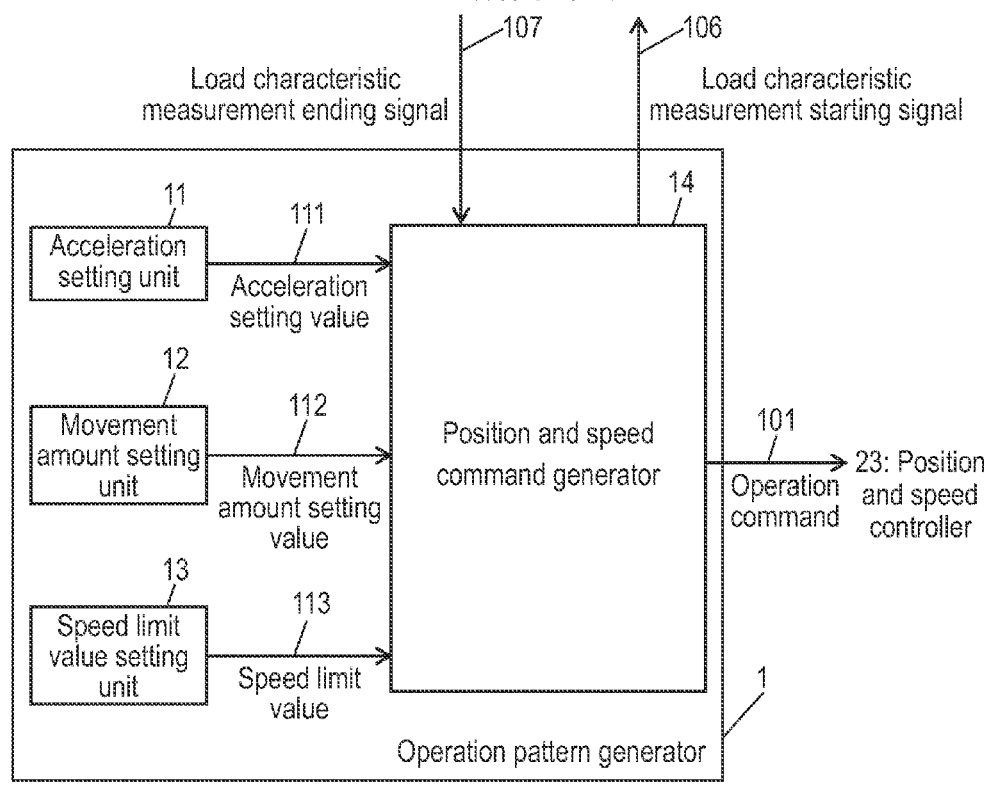
FIG. 2 is a block diagram illustrating an operation pattern generator according to an exemplary embodiment of the present invention.
Figure 3:
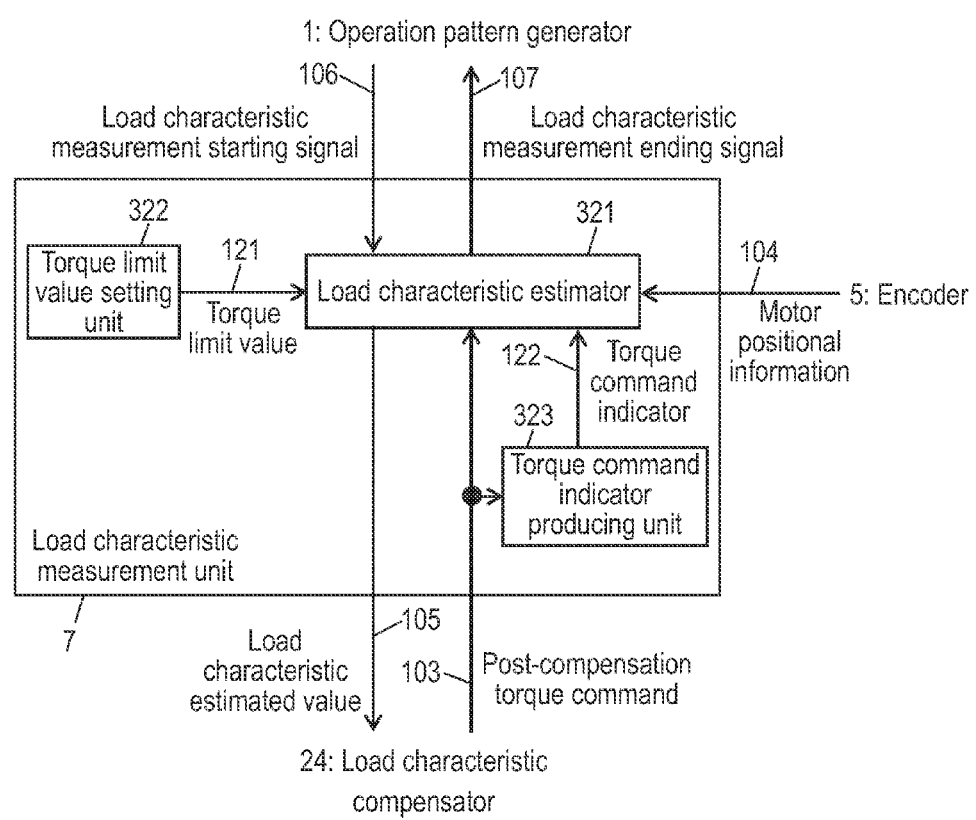
FIG. 3 is a block diagram illustrating a load characteristic measurement unit according to an exemplary embodiment of the present invention.

FIG. 1 is a block diagram illustrating a motor drive device according to an exemplary embodiment of the present invention. FIG. 2 is a block diagram illustrating an operation pattern generator according to an exemplary embodiment of the present invention. FIG. 3 is a block diagram illustrating a load characteristic measurement unit according to an exemplary embodiment of the present invention.

The component similar to that of conventional motor drive device 402 in FIG. 4 is designated by the identical reference mark, and the description in FIG. 4 is incorporated herein.

Motor drive device 30 according to the exemplary embodiment of the present invention drives motor 4. Motor drive device 30 includes operation pattern generator 1, position and speed controller 23, load characteristic compensator 24, and load characteristic measurement unit 7.

Operation pattern generator 1 generates an operation pattern that issues an instruction of at least one of a motor speed and a motor position with respect to motor 4. Operation pattern generator 1 generates operation command 101 including at least one operation pattern. Operation pattern generator 1 transmits generated operation command 101.

Position and speed controller 23 receives operation command 101 and motor positional information 104 transmitted from encoder 5. Position and speed controller 23 generates torque command 102 such that a deviation of at least one of the motor position and the motor speed becomes zero. Position and speed controller 23 transmits generated torque command 102.

Load characteristic compensator 24 performs scaling processing on torque command 102 transmitted from position and speed controller 23 in accordance with total inertia. As used herein, the total inertia means inertia of motor 4 or load 6, and the like. Load characteristic compensator 24 performs the scaling processing to absorb a difference of load inertia. Load characteristic compensator 24 adds a friction torque estimated value of load 6 to the torque command after the scaling processing, and generates post-compensation torque command 103 for driving motor 4.

Load characteristic measurement unit 7 generates torque command indicator 122 and torque limit value 121. Load characteristic measurement unit 7 receives post-compensation torque command 103 and motor positional information 104. Load characteristic measurement unit 7 measures the load characteristic of load 6 to set load characteristic compensator 24.

Particularly, operation pattern generator 1 increases an absolute value of acceleration, at which the motor speed or the motor position is changed, in each operation pattern.

Load characteristic measurement unit 7 measures the load characteristic to set load characteristic compensator 24 when torque command indicator 122 is less than or equal to torque limit value 121. Load characteristic measurement unit 7 ends the measurement of the load characteristic without setting load characteristic compensator 24 when torque command indicator 122 is greater than torque limit value 121.

A specific example in which motor drive device 30 of the exemplary embodiment exerts a significant effect will be described below.

In motor drive device 30, operation command 101 becomes a position command, which becomes a triangular waveform by derivation, in the case that position and speed controller 23 performs position control. In the case that position and speed controller 23 performs speed control, operation command 101 becomes a speed command having a triangular waveform.

Therefore, motor drive device 30 can automatically generate the operation pattern having the minimum amount of time required for the designated movement amount.

In motor drive device 30, operation pattern generator 1 also includes speed limit value 113. In the case that a maximum value indicating the speed command is larger than speed limit value 113, operation pattern generator 1 generates the operation pattern using the acceleration and speed limit value 113.

Therefore, motor drive device 30 can automatically generate the operation pattern that is restricted by the designated maximum speed. Motor drive device 30 can reduce the movement amount of the operation pattern.

Alternatively, in motor drive device 30, operation pattern generator 1 also includes speed limit value 113. In the case that the maximum value indicating the speed command is larger than speed limit value 113, operation pattern generator 1 does not generate the operation pattern. Load characteristic measurement unit 7 ends the measurement of the load characteristic.

Therefore, motor drive device 30 can automatically generate the operation pattern that is restricted by the designated maximum speed.

In motor drive device 30, the operation pattern also includes an acceleration and deceleration time. In the case that the acceleration and deceleration time is shorter than a lower limit of a measurement time during which the load characteristic can be measured, operation pattern generator 1 does not generate the operation pattern. Load characteristic measurement unit 7 ends the measurement of the load characteristic.

Therefore, in motor drive device 30, the time necessary for the load measurement can be reduced because the unnecessary operation command is not generated.

In motor drive device 30, the operation pattern also includes torque command 102. Torque command indicator 122 is a maximum value of an absolute value of torque command 102 included in the operation pattern.

Alternatively, in motor drive device 30, the operation pattern also includes torque command 102. Torque command indicator 122 is larger one of an effective value of torque command 102 in an acceleration section included in the operation pattern and an effective value of torque command 102 in a deceleration section included in the operation pattern.

Alternatively, in motor drive device 30, torque command indicator 122 is calculated by a later-described equation (1). Where "a" is acceleration of the operation pattern. "ω" is a maximum speed in the operation pattern. "J" is total inertia that is of load characteristic estimated value 105. "R" is a viscous friction coefficient. "Td" is a composite value of kinetic friction and a biased weight. At this point, the equation (1) is obtained as follows.

$$\text{torque command indicator} = J \times a + R \times \omega + Td \quad (1)$$

Therefore, motor drive device 30 can obtain torque command indicator 122 in accordance with a demand of the worker.

The detailed description will be made with reference to the drawings.

As illustrated in FIGS. 1 and 2, operation pattern generator 1 generates operation command 101. Operation pattern generator 1 transmits generated operation command 101 to position and speed controller 23. In accordance with the generation of operation command 101, operation pattern generator 1 transmits load characteristic measurement starting signal 106 indicating an enabled state to load characteristic measurement unit 7.

In the following cases, operation pattern generator 1 transmits load characteristic measurement starting signal 106 indicating a disable state to load characteristic measurement unit 7. One of the cases is the case that operation pattern generator 1 ends the generation of operation command 101. The other case is the case that operation pattern generator 1 receives load characteristic measurement ending signal 107 transmitted from load characteristic measurement unit 7.

Position and speed controller 23 receives, together with operation command 101, motor positional information 104 that is transmitted from encoder 5 connected to motor 4 which is to be driven. Position and speed controller 23 performs a feedback calculation typified by PID control. Position and speed controller 23 transmits torque command 102 to load characteristic compensator 24 as a result of the feedback calculation.

Load characteristic compensator 24 receives, together with torque command 102, load characteristic estimated value 105 transmitted from load characteristic measurement unit 7 and motor positional information 104 transmitted from encoder 5. Load characteristic compensator 24 transmits post-compensation torque command 103.

Load characteristic estimated value 105 includes the total inertia of motor 4 and load 6. The load characteristic compensator 24 performs the scaling processing on torque command 102 in accordance with the total inertia. Torque command 102 performs the scaling processing to absorb a difference in motor equivalent inertia that varies in accordance with various loads 6.

Load characteristic estimated value 105 includes friction torques, such as a biased weight torque, a kinetic friction torque, and a viscous friction torque, which exist in motor 4 and load 6. These friction torques improve readiness and reduce a response difference in operation direction or speed during the drive of motor 4.

As illustrated in FIGS. 1 and 3, load characteristic measurement unit 7 receives, together with post-compensation torque command 103, motor positional information 104 and load characteristic measurement starting signal 106.

In the case that received load characteristic measurement starting signal 106 is enabled, load characteristic measurement unit 7 automatically estimates the total inertia or the friction torque based on post-compensation torque command 103 and motor positional information 104. For example, the total inertia or the friction torque can be calculated using least square estimation. As used herein, the total inertia means a summation of the inertia of motor 4 and the inertia of load 6.

In the case that load characteristic measurement starting signal 106 is disable, load characteristic measurement unit 7 does not perform the automatic estimation.

A voltage or a current is supplied to motor 4 through current control or power circuit. The voltage or current supplied to motor 4 is adjusted in accordance with post-compensation torque command 103 transmitted from load characteristic compensator 24. Therefore, an output torque of motor 4 changes in accordance with post-compensation torque command 103. As a result, load 6 connected to motor 4 operates.

Operation pattern generator 1 will be described in detail below with reference to FIG. 2.

As illustrated in FIG. 2, operation pattern generator 1 includes acceleration setting unit 11, movement amount setting unit 12, speed limit value setting unit 13, and position and speed command generator 14.

Acceleration setting unit 11 generates acceleration setting value 111. Acceleration setting unit 11 transmits generated acceleration setting value 111 to position and speed command generator 14. An initial value of acceleration setting value 111 is set to a lower limit at which the load characteristic can be measured by load characteristic measurement unit 7. In accordance with acceleration setting value 111, the acceleration increases gradually in each cycle of operation command 101 generated by position and speed command generator 14.

Acceleration setting unit 11 increases the acceleration by the following methods. In one of the methods, it is assumed that present acceleration is calculated by adding given acceleration to previous acceleration. In another method, the present acceleration is set to a value that is obtained by doubling the previous acceleration.

It is also conceivable that a relationship between the acceleration and the necessary torque is substantially known. The worker may set the initial value of the acceleration in order to deal with such cases.

Movement amount setting unit 12 generates movement amount setting value 112. Movement amount setting unit 12 transmits generated movement amount setting value 112 to position and speed command generator 14. There is a method for setting a specified value, such as one revolution or two revolutions of the motor, as movement amount setting value 112. There is also a method in which the worker sets movement amount setting value 112 in accordance with an operational range of the instrument provided with the motor. In each method, desirably movement amount setting value 112 is set in consideration of the time necessary for the measurement of the movement amount or the load characteristic.

Speed limit value setting unit 13 generates speed limit value 113. Speed limit value setting unit 13 transmits generated speed limit value 113 to position and speed command generator 14.

Examples of speed limit value 113 include the maximum speed of the motor, a rated speed of the motor, an allowable speed in the instrument provided with the motor, and a speed having a margin that is obtained by multiplying these speeds by a certain coefficient. Alternatively, the worker may set movement amount setting value 113 in accordance with an actual use condition.

Position and speed command generator 14 generates operation command 101 based on received acceleration setting value 111, movement amount setting value 112, and speed limit value 113. Position and speed command generator 14 transmits generated operation command 101 to position and speed controller 23.

Operation command 101 becomes the position command in the cased that position and speed controller 23 performs the position control. Operation command 101 becomes the speed command in the case that position and speed controller 23 performs the speed control.

Operation command 101 is uniquely determined from the acceleration and the movement amount when the speed command is formed into a triangular waveform. As used herein, the triangular waveform means that the speed is increased at constant acceleration, and decreased at acceleration having magnitude equal to the acceleration when reaching a given value.

When the speed command is formed into the triangular waveform, position and speed command generator 14 can generate operation command 101 having the minimum amount of time required for the designated movement amount. Position and speed command generator 14 also generates one operation pattern to perform a reciprocating operation by a combination of a certain triangular waveform and a triangular waveform having an inverted sign of the speed. Because the one operation pattern performs the reciprocating operation, the movement amount can be reduced with respect to the whole estimation of the load characteristic.

Operation command 101 is generated such that one cycle is formed by combining a plurality of operation patterns. The generation of operation command 101 improves load characteristic estimation accuracy in load characteristic measurement unit 7. In the case that the maximum speed in operation command 101 is larger than speed limit value 113, position and speed command generator 14 generates operation command 101 again based on acceleration setting value 111 and speed limit value 113.

Position and speed command generator 14 may transmit load characteristic measurement starting signal 106 indicating the disable state to load characteristic measurement unit 7 without outputting operation command 101, and end the measurement of the load characteristic. In the case that the maximum speed in operation command 101 does not exceed lower than speed limit value 113, position and speed command generator 14 transmits load characteristic measurement starting signal 106 indicating the enabled state to the load characteristic measurement unit 7 in accordance with the starting of the output of operation command 101.

In the case that load characteristic measurement unit 7 transmits load characteristic measurement ending signal 107 to position and speed command generator 14, position and speed command generator 14 transmits load characteristic measurement starting signal 106 indicating the disable state to load characteristic measurement unit 7. Load characteristic measurement unit 7 ends the measurement of the load characteristic.

In the case that the acceleration and deceleration time of the operation pattern is shorter than the lower limit of the measurement time during which the load characteristic can be measured, position and speed command generator 14 does not transmit operation command 101. Position and speed command generator 14 transmits load characteristic measurement starting signal 106 indicating the disable state to load characteristic measurement unit 7. Load characteristic measurement unit 7 ends the measurement of the load characteristic.

Load characteristic measurement unit 7 will be described in detail below with reference to FIG. 3.

As illustrated in FIG. 3, load characteristic measurement unit 7 includes load characteristic estimator 321, torque limit value setting unit 322, and torque command indicator producing unit 323.

Torque limit value setting unit 322 generates torque limit value 121. Torque limit value setting unit 322 transmits generated torque limit value 121 to load characteristic estimator 321. Examples of torque limit value 121 include the maximum torque of the motor, a rated torque of the motor, a torque having a margin that is obtained by multiplying these torques by a certain coefficient, and a torque that is set by the worker in accordance with the actual use condition.

Frequently, a control gain of a position and speed loop determining servo responsiveness is set to a lower level because the load characteristic such as an inertia ratio is unknown in measuring the load characteristic.

Therefore, the following is supposed when the control gain is adjusted using the identical operation command pattern after the measurement of the load characteristic. It is supposed that the torque command increases during the acceleration and deceleration when the servo responsiveness is set to a higher level. Therefore, desirably torque limit value 121 has a certain level of margin for the maximum torque of the motor, the rated torque of the motor, or the torque on the actual use condition.

Torque command indicator producing unit 323 receives post-compensation torque command 103 transmitted from load characteristic compensator 24. Torque command indicator producing unit 323 generates torque command indicator 122. Torque command indicator producing unit 323 transmits generated torque command indicator 122 to load characteristic estimator 321.

Torque command indicator 122 can be obtained by the following methods. A first method focuses on an absolute value of the torque command in one operation pattern. In the absolute values of the torque command, a maximum value is used as torque command indicator 122.

A second method focuses on an effective value of the torque command in an acceleration section and an effective value of the torque command in a deceleration section in one operation pattern. The effective value of torque command in the acceleration section and the effective value of torque command 102 in the deceleration section are compared to each other, and larger one of the effective values is used as torque command indicator 122.

In a third method, there is a method to calculate by the equation (1) using the load characteristic estimated value and the acceleration, and the like.

Load characteristic estimator 321 receives load characteristic measurement starting signal 106 transmitted from operation pattern generator 1. Load characteristic estimator 321 estimates the load characteristic when receiving load characteristic measurement starting signal 106 indicating the enabled state. The load characteristic is estimated by estimating automatically the total inertia of the motor and the load or the friction torque from post-compensation torque command 103 and motor positional information 104 by, for example, the least square estimation. Examples of the friction torque include the biased weight torque, the kinetic friction torque, and the viscous friction torque.

In the case that torque command indicator 122 is less than or equal to torque limit value 121, load characteristic estimator 321 updates load characteristic estimated value 105 using a result of the automatic estimation. Load characteristic estimator 321 transmits updated load characteristic estimated value 105 to load characteristic compensator 24.

In the case that torque command indicator 122 is larger than torque limit value 121, load characteristic estimator 321 does not update load characteristic estimated value 105. Load characteristic estimator 321 transmits load characteristic measurement ending signal 107 to operation pattern generator 1.

Sometimes an initial value of load characteristic estimated value 105 is roughly found. The worker may set the initial value of load characteristic estimated value 105 in order to deal with such cases. In the case that the initial value of load characteristic estimated value 105 is unknown, desirably the inertia of the motor is used as the total inertia and the friction torque is set to zero.

The torque command transmitted from the position and speed controller is increased as much as possible, or brought close to the actual use condition. As a result, the acceleration is increased as much as possible, or brought close to the actual use condition, thereby improving measurement accuracy of the load characteristic.

In order to prevent the oscillations of motor 4 and load 6 during the measurement of the load characteristic, desirably the control gain of the position and speed loop determining the servo responsiveness is set to a lower level before the measurement of the load characteristic.

There is an adaptive algorithm for minimizing a difference with a normative input by extracting a vibration component caused by the resonance characteristics of the motor and load. In the case that the motor drive device includes an adaptive filter function of automatically adjusting a notch filter suppressing the resonance using the adaptive algorithm, the load characteristic may be measured while the adaptive filter function is enabled.

The oscillation detecting function extracts a fluctuation component from motor positional information 104 transmitted from encoder 5. Oscillation detecting function detects oscillation states of motor and load by a comparison between the extracted fluctuation component and a threshold, a determination of a duration, and the like. In the case that the oscillation detecting function detects the oscillation, the control gain of the position and speed loop determining the servo responsiveness is automatically set to a lower level to suppress signal transmission. In the case that the motor drive device includes such oscillation detecting function, the load characteristic may be measured while the oscillation detecting function is enabled.

As is clear from the above description, in the motor drive device of the exemplary embodiment of the present invention, the load characteristic is automatically measured at high acceleration and high torque. Therefore, even the worker who does not have the detailed knowledge about the servo adjustment can obtain the proper adjustment result.

Additionally, the proper adjustment result can be obtained because the torque limit value is properly set to automatically generate the operation pattern close to the actual use condition.

INDUSTRIAL APPLICABILITY

With the motor drive device of the present invention, even the worker who does not have the detailed knowledge about the servo adjustment can obtain the proper adjustment result.

The invention claimed is:

1. A motor drive device that drives a motor, the motor drive device comprising:
an operation pattern generator that generates an operation pattern and an operation command, the operation pattern issuing an instruction of at least one of a motor speed and a motor position to the motor, the operation command including at least one operation pattern;
a position and speed controller that receives the operation command and motor positional information transmitted from an encoder, generates a torque command such that a deviation of at least one of the motor position and the motor speed becomes zero, and transmits the generated torque command;
a load characteristic compensator that receives the torque command, the motor positional information, and a load characteristic estimated value, adds a friction torque estimated value of a load after multiplying the torque command by total inertia of the motor and the load applied to the motor, and generates a post-compensation torque command that drives the motor; and
a load characteristic measurement unit that generates a torque command indicator and a torque limit value, receives the post-compensation torque command and the motor positional information, and measures a load characteristic of the load to set the load characteristic compensator, torque command indicator being a value of the torque command in the operation pattern, torque limit value being provided in consideration of a specification or a use condition of the motor,
wherein the operation pattern generator increases an absolute value of acceleration, at which the motor speed or the motor position is changed, in each operation pattern,
the load characteristic measurement unit measures the load characteristic to set the load characteristic compensator when the torque command indicator is less than or equal to the torque limit value, and the load characteristic measurement unit ends the measurement of the load characteristic without setting the load characteristic compensator when the torque command indicator is greater than the torque limit value.

2. The motor drive device according to claim 1, wherein the operation command becomes a position command having a triangular waveform by derivation when the position and speed controller performs position control, and the operation command becomes speed command having the triangular waveform when the position and speed controller performs speed control.

3. The motor drive device according to claim 2, wherein the operation pattern generator includes a speed limit value, and
the operation pattern generator generates the operation pattern using the acceleration and the speed limit value when a maximum value indicating the speed command is larger than the speed limit value.

4. The motor drive device according to claim 3, wherein the operation pattern includes an acceleration and deceleration time, and
when the acceleration and deceleration time is shorter than a lower limit of a measurement time during which the load characteristic can be measured, the operation pattern generator does not generate the operation pattern, and
the load characteristic measurement unit ends the measurement of the load characteristic.

5. The motor drive device according to claim 2, wherein the operation pattern generator includes a speed limit value, and
when a maximum value indicating the speed command is larger than the speed limit value, the operation pattern generator does not generate the operation pattern, and
the load characteristic measurement unit ends the measurement of the load characteristic.

6. The motor drive device according to claim 5, wherein the operation pattern includes an acceleration and deceleration time, and
when the acceleration and deceleration time is shorter than a lower limit of a measurement time during which the load characteristic can be measured, the operation pattern generator does not generate the operation pattern, and
the load characteristic measurement unit ends the measurement of the load characteristic.

7. The motor drive device according to claim 2, wherein the operation pattern includes an acceleration and deceleration time, and
when the acceleration and deceleration time is shorter than a lower limit of a measurement time during which the load characteristic can be measured, the operation pattern generator does not generate the operation pattern, and
the load characteristic measurement unit ends the measurement of the load characteristic.

8. The motor drive device according to claim 1, wherein the operation pattern includes the torque command, and
the torque command indicator is a maximum value of an absolute value of the torque command included in the operation pattern.

9. The motor drive device according to claim 1, wherein the operation pattern includes the torque command, and
the torque command indicator is larger one of an effective value of the torque command in an acceleration section included in the operation pattern and an effective value of the torque command of a deceleration section included in the operation pattern.

10. The motor drive device according to claim 1, wherein the torque command indicator is calculated by torque command indicator=$J \times a + R \times \omega + Td$, where "a" is acceleration of the operation pattern, "$\omega$" is a maximum speed in the operation pattern, "J" is inertia that is of the load characteristic estimated value, "R" is a viscous friction coefficient, and "Td" is a composite value of a kinetic friction and a biased weight.

* * * * *